United States Patent
Delpierre, III et al.

(10) Patent No.: US 8,372,457 B2
(45) Date of Patent: Feb. 12, 2013

(54) BLENDABLE CHEESE SNACK

(75) Inventors: Phillip Delpierre, III, Plymouth, WI (US); Karl L. Linck, Kohler, WI (US); John Kieran Brody, Plymouth, WI (US); Nancy M. Krahn, Glenbeulah, WI (US); Brian L. Kaufman, Cascade, WI (US)

(73) Assignee: Sargento Foods Inc., Plymouth, WI (US)

( * ) Notice: Subject to any disclaimer, the term of this patent is extended or adjusted under 35 U.S.C. 154(b) by 2011 days.

(21) Appl. No.: 11/463,354

(22) Filed: Aug. 9, 2006

(65) Prior Publication Data

US 2008/0038440 A1    Feb. 14, 2008

(51) Int. Cl.
    *B65D 81/32* (2006.01)
(52) U.S. Cl. ......... 426/120; 426/115; 426/124; 426/130
(58) Field of Classification Search .................. 426/115, 426/120, 124, 130
    See application file for complete search history.

(56) References Cited

U.S. PATENT DOCUMENTS

| | | | | |
|---|---|---|---|---|
| 1,889,882 A | * | 12/1932 | Woods | 426/112 |
| 2,236,641 A | * | 4/1941 | Karmen | 426/120 |
| 2,527,919 A | * | 10/1950 | Leon | 426/120 |
| 2,739,751 A | * | 3/1956 | Bailey | 220/522 |
| 3,496,713 A | | 11/1968 | Reinhardt et al. | |
| 3,442,435 A | | 5/1969 | Ludder et al. | |
| 3,573,069 A | * | 3/1971 | Zeller et al. | 426/120 |
| 4,202,465 A | | 5/1980 | McLaren | |
| 4,256,256 A | | 3/1981 | Meyers | |
| 4,312,473 A | | 1/1982 | Hoeller | |
| 4,340,138 A | * | 7/1982 | Bernhardt | 206/216 |
| 4,596,713 A | | 6/1986 | Burdette | |
| 4,874,618 A | | 10/1989 | Seaborne et al. | |

(Continued)

OTHER PUBLICATIONS

Dole™ Product Announcement, SDole Food Company [on line] Apr. 2001 [retrieved on Sep. 23, 2009]. Retrieved from the Internet<URL: http://web.archive.org/web/20010426143002/dole.com/health/vegetables/caesar_complete.ghtmll>.*

(Continued)

*Primary Examiner* — Rena Dye
*Assistant Examiner* — C. Smith
(74) *Attorney, Agent, or Firm* — Reinhart Boerner Van Deuren s.c.

(57) ABSTRACT

A cheese product, suitable for use as a cheese snack and/or food topping includes packaging in which moist cheese components of the snack or topping are separately sealed within a secondary package, prior to both the moist cheese and dry components of the snack or topping being sealed within a common primary container. At the time of use, a consumer opens both the primary container and the secondary package, and mixes the moist and dry components within the primary container. Following mixing, the resultant mixture of moist and dry components may be consumed directly from the primary container, or be poured out of or otherwise removed from the primary container for use as a food topping on foods such as salads, pizza, or baked potatoes. The secondary package is formed from a material and sealed in a manner that effectively precludes moisture migration between the moist and dry products during storage of the unmixed snack or topping, to thereby provide a longer shelf life.

56 Claims, 7 Drawing Sheets

U.S. PATENT DOCUMENTS

| | | | |
|---|---|---|---|
| 5,277,920 A | | 1/1994 | Weaver, Jr. |
| 5,747,084 A | * | 5/1998 | Cochran et al. ............... 426/120 |
| 5,962,052 A | * | 10/1999 | Acknin et al. ................. 426/112 |
| 6,021,903 A | | 2/2000 | Hanson |
| 6,152,302 A | | 11/2000 | Miller et al. |
| 6,645,539 B2 | | 11/2003 | Bukowski et al. |
| 6,743,451 B2 | | 6/2004 | Rasile et al. |
| 6,789,945 B2 | | 9/2004 | Mobs et al. |
| 2001/0012531 A1 | * | 8/2001 | Abdullovski ................. 426/120 |
| 2002/0008106 A1 | * | 1/2002 | Bezek et al. ................. 220/4.27 |
| 2003/0087015 A1 | * | 5/2003 | Wyslotsky et al. ........... 426/397 |
| 2004/0009266 A1 | * | 1/2004 | Violi et al. ...................... 426/94 |
| 2004/0096551 A1 | * | 5/2004 | Tomlinson ................... 426/115 |
| 2006/0034995 A1 | * | 2/2006 | DeSmidt et al. .............. 426/582 |
| 2006/0068063 A1 | * | 3/2006 | Zerfas et al. .................. 426/120 |

OTHER PUBLICATIONS

Sicherman, A. 'Tidbits', (Minneapolis) Star Tribune, Oct. 27, 1993, Metro Edition, Taste, p. 02T [on line] Minnepolis, Minnesota [retrieved on Sep. 25, 2009]. Retrieved from: Dialog Information Services, Palp Alto, CA, USA. Dialog Accession No. 07301125.*

* cited by examiner

BLENDABLE CHEESE SNACK

BACKGROUND OF THE INVENTION

Field of the Invention

The present invention relates generally to the use of cheese pieces in snack foods and for food toppings, and more particularly to new and unique blendable cheese snacks and toppings which are packaged in such a manner that the cheese pieces are packaged separately from other components of the snack and/or toppings, and are mixed with the other components by a consumer, just prior to use of the cheese snack or topping, together with methods for manufacture and use of such blendable cheese snacks and toppings.

Pieces of moist cheese, in diced, shredded or curd forms, for example, are commonly used constituents of cheese products, such as snack foods and food toppings (that may be used, for example, on salads), in which the moist cheese pieces are mixed together with a wide variety of additional constituents such as: dried fruits and vegetables; nuts; seeds; seasonings; and bakery goods. In the past, the moist cheese pieces have been mixed with the additional constituents, by the manufacturer of the cheese products, and the resultant mixture has been packaged in a common container for sale to consumers. Examples of such uses of cheese are provided by a U.S. Patent Application Publication No. 2006/0034995, titled: Shredded Cheese Product and Method of Making Same, to DeSmidt, et al., which is assigned to the Assignee of the present invention, the disclosure and teachings of which are incorporated herein by reference in their entirety.

Although prior cheese products, using moist cheese pieces mixed directly with additional components, such as the cheese products of the Assignee's published U.S. Patent Application Publication 2006/0034995, have achieved significant success and acceptance within the marketplace, the shelf life of such products has been shorter than is desirable, particularly where the cheese snack or topping product includes moist cheese pieces in combination with dry blending products, such as dried fruits and vegetables, seasonings, nuts and bakery products.

A major factor contributing to the limited shelf life of prior snack foods and food toppings having moist cheese mixed with dry blending products is the migration of moisture from the cheese pieces to the dry blending products, within the packaging, prior to actual use of the product by a consumer. Migration of moisture from the cheese pieces to the dry blending product causes the cheese pieces to dry out and potentially become less palatable. In addition, migration of moisture into the dry blending products can raise the moisture content of the dry blending products, and in particular components such as dried fruits and vegetables, to the point where microbial growth may occur on the dry blending components, within the packaging, to such a degree that the dry blending components will become unpalatable or spoiled. In order to preclude having moisture migration within the packaging progress to a point that the snacks or toppings become unpalatable or spoiled, it has been necessary, in the past, for manufacturers to suggest shelf lives for such products which are shorter than is desirable.

It is desirable, therefore, to provide an improved cheese product, in a form suitable for use as a snack food or a food topping, and methods for manufacture and use of such snack foods and toppings which substantially reduce the migration of moisture from the moist cheese pieces to the dry blending products in snacks and toppings containing moist cheese pieces It is also desirable to provide an improved cheese product, in a form suitable for use as a snack food or a food topping, that is amenable to including meat products, in the snack food or topping, in moist forms of fermented meats, such as salami and summer sausage or dried meats, such as dried beef or beef jerky. It is further desirable to provide an improved system of packaging such snack foods and toppings, in a manner which is more readily conducive to consumption or use of the snack foods and toppings by a consumer.

SUMMARY OF THE INVENTION

The invention provides an improved cheese snack and/or food topping through use of innovative packaging in which moist components of the snack or topping are separately sealed within a secondary package prior to both the moist and dry components of the snack or topping being sealed within a common primary container. At the time of use, a consumer opens both the primary container and the secondary package, and mixes the moist and dry components within the primary container. Following mixing of the moist and dry components, the resultant mixture may be consumed directly from the primary container, or poured out of or otherwise removed from the primary container for use as a food topping (such as, for example, as a topping for salads). The secondary package is formed from a material and sealed in such a manner that moisture migration between the moist and dry components is effectively precluded, during storage of the unmixed snack or topping, to thereby provide substantially longer shelf lives than can typically be obtained for previous snack and topping products in which moist cheese pieces are mixed directly with dry blending products for sale within a common container.

In one form of the invention, a blendable cheese snack includes a primary container, a dry blending product, cheese pieces, and a secondary package formed from a material precluding loss of moisture from the cheese pieces. The primary container defines a primary volume of the container. The dry blending product is disposed within the primary volume. The cheese pieces, having a desired approximate shape and size, are sealed within the secondary package. The secondary package, containing the cheese pieces therein, is disposed within the primary volume of the container, together with the dry blending product, prior to the secondary package being opened by a consumer for mixing with the dry blending product. The container is configured and sized such that the primary volume of the container is sufficient for mixing the cheese pieces, from the opened secondary package, with the dry blending product, within the primary volume.

Some forms of a blendable cheese snack, according to the invention, may further include a tertiary package, disposed within the primary volume of the container, and containing the dry blending product prior to the tertiary package being opened by the consumer for mixing together with the cheese pieces from the open secondary package, within the primary volume. Some forms of the invention may also include additional tertiary packages, disposed within the primary volume, and containing additional dry or moist products therein, for mixture with the cheese pieces and dry blending product within the primary container by the consumer just prior to use of the cheese snack. In some forms of the invention, such additional moist components may include, for example, fermented or dried meats. Tertiary packages containing such additional moist components may be manufactured from a material precluding loss of moisture from the additional moist components.

The secondary package containing the cheese pieces, and any tertiary packages may be hermetically sealed, preferably with a modified atmosphere such as nitrogen being used to extend the shelf-life of the product. In addition, the primary volume of the container may also be completely or partially hermetically sealed and may also use a modified atmosphere such as nitrogen, following insertion therein of any or all of the secondary package, containing the cheese pieces, the dry blending product, and/or any tertiary packages containing the dry blending product or any additional components of the blendable cheese snack.

In some forms of the invention, the container is sized and shaped for allowing the resultant mixture of the cheese pieces, the dry blending product, and any additional components of the blendable cheese snack to be consumed directly from the container as a snack food. In other forms of the invention, the container is configured for allowing the resultant mixture to be conveniently removed from the container, by pouring or spooning out the resultant mixture forming the blendable cheese snack, for example, for use of the blendable cheese snack as a food topping (such as, for example, as a topping on salads).

In one form of the invention, the primary container and secondary package are both sealed pouches, which are opened by the consumer prior to mixing the cheese pieces and dry blending product together within the primary volume of the container. The pouch forming the primary container may be re-sealable. The pouch forming the container may also be a stand-up pouch.

In some forms of the invention, the container may include a cup having a detachable lid, for closing the primary volume. The container may further include a removable tamper-evident barrier for retaining the secondary package containing the cheese pieces and/or the dry blending product, within the cup when the lid is removed, and/or for retaining the secondary package containing the cheese pieces, and/or the dry blending product, within the lid, when the lid is removed from the cup. The tamper-evident barrier may be hermetically sealed to the cup and/or the lid. The lid may be hermetically sealed to the cup. The lid of the container may be arched, such that the primary volume within the container is split between a cup portion of the primary volume, located inside the cup, and a lid portion of the primary volume located within the arched lid.

The primary volume of the container, according to the invention, may include sufficient head space, so that the cheese pieces, dry blending product, and any additional component of a cheese snack, according to the invention, may be mixed within the primary volume, by shaking the container, after the cheese pieces, dry blending product, and any additional component are removed from the secondary and any tertiary packages and placed within the primary volume. The container may include at least a portion thereof, formed from a transparent material, so that the cheese pieces, dry blending product, and additional components, within the primary volume, may be viewed through the container, during the mixing process.

A method for preparing a blendable cheese snack, according to the invention, may include manufacturing a container, defining a primary volume of the container, and placing a dry blending product within the primary volume. Cheese pieces are then sealed within a secondary package, formed from a material precluding loss of moisture from the cheese pieces, and the secondary package, containing the cheese pieces therein, is then placed within the primary volume of the container, together with the dry blending product.

A method, according to the invention, may further include, opening the secondary package for mixing the cheese pieces with the dry blending product, and mixing the cheese pieces from the open secondary package with the dry blending product, within the primary volume, to form a resultant mixture of cheese pieces and dry blending product.

A method, according to the invention, may also include placing a tertiary package, containing the dry blending product, or an additional moist or dry component, within the primary volume of the container, together with the secondary package containing the cheese pieces. The method may further include opening the secondary and tertiary packages for mixing the cheese pieces with the dry blending product, and mixing the cheese pieces from the open secondary package with the dry blending product or additional component from the tertiary package, within the primary volume, to form a resultant mixture of cheese pieces, dry blending product, and any additional component.

A method, according to the invention, may further include manufacturing the container to include a closure element that is openable and reclosable. The closure element is opened for removal of the secondary package, and any tertiary packages from the primary volume. The contents of the secondary and any tertiary packages are poured into the primary volume, and the primary volume is resealed by closing the container with the closure element. The container may then be shaken, with the closure element closed, to mix the contents of the primary volume with one another. The closure element is then opened, after mixing, to allow access to the blended cheese snack in the primary volume.

In a method, according to the invention, the resultant mixture forming a cheese snack or topping, according to the invention, may be retained within the container, for consumption directly from the container. A method, according to the invention, may also, or alternatively, include removing a portion of the resultant mixture from the container for use as a food topping on salads or on other foods.

In practicing the invention, the cheese pieces may take any suitable form, including substantially cubed-shaped dice, sticks of cheese (for example, one and one-half to two inches long), cheese shreds, cheese curds, string cheese, or any other shapes of cheese. In some forms of the invention, the cheese pieces may be a mixture of at least two different cheeses. Meat products used in practicing the invention may also take any suitable form, including strips, substantially cubed-shaped dice, slices, bits, or randomly shaped pieces.

In some forms of the invention, the cheese pieces may constitute approximately fifty-five percent (55%), by weight, of the blendable cheese snack, and the dry blending product may constitute approximately forty-five percent (45%), by weight, of the blendable cheese snack, according to the invention.

The dry blending product, in a blendable cheese snack, according to the invention, may include any suitable constituent, including, but not limited to dried fruits, nuts, vegetables, seasonings, and bakery goods. In blendable cheese snacks, according to the invention, having meat products as a constituent, the meat products may be of any suitable type and configuration, including, but not limited to: fermented meats, such as salami and summer sausage; dried meats, such as dried beef and beef jerky; and cooked meats, such as chicken.

Where the cheese pieces are substantially cubed-shaped dice, the dice may have a linear dimension in the range of ⅛-⅜ inch, such as ⅜ of an inch.

Any of a variety of cheeses can serve as the moist cheese pieces, or as a constituent of a blend of two or more cheeses, according to the invention. For example, natural cheeses such as, mozzarella, Monterey Jack, asiago, Colby, cheddar, and Colby-Jack cheeses can all be used as cheese pieces, in practicing the invention. Additionally, blends of two or more cheeses can also be used as the cheese pieces. In addition, process cheeses, imitation cheeses, and vegan cheeses may also be used as cheese pieces in practicing the invention, so the term "cheese" as used herein should be broadly interrupted to include any suitable natural cheese or imitation cheese products.

Any suitable type and form of dried fruit may be used, in practicing the invention, such as, but not limited to apples, cranberries, mangos, and raisins. The dried fruit may be sweetened, or seasoned with spices such as cinnamon.

With regard to vegetable components, of a blendable cheese snack, according to the invention, a number of different vegetables can be utilized. For example, sun-dried tomatoes, garlic, basil, dehydrated tomatoes, cilantro, jalapeños, or combinations thereof may be used. Other vegetables could be used as well, with likely candidates being peppers (both hot peppers and sweet peppers), mushrooms, onions, etc. Another vegetable-based item which may be used is imitation bacon bits or chips.

It will be appreciated, by those having skill in the art, that several of the vegetables (such as garlic, basil, cilantro, jalapeños, and oregano, for example) are also highly savory seasonings and thus will serve as both vegetable components and seasonings when added to the cheese pieces. Other vegetables to be used (such as sun-dried tomatoes, dehydrated tomatoes, sweet peppers, mushrooms, and onions, for example) may be supplemented with spices which compliment the particular vegetable or combination of vegetables.

Examples of spices which may be used in practicing the invention may include salsa Verde seasoning (which includes a variety of powdered vegetables such as tomatoes, onions, bell peppers, cilantro, garlic, celery and parsley), salt, pepper, basil, oregano, cinnamon, sugar, and various other seasonings, coatings or treatments to provide a honey roasted, smoked, or barbeque flavor, for example, to components of the dry blending product. Alternatively, a vegetable which does not have seasoning characteristics could instead be used with another vegetable which does have a seasoning characteristic (for example, using basil and/or oregano with sun-dried tomatoes).

Those having skill in the art will appreciate that the terms "fruit" and "vegetable," as used in practicing the invention, are not intended to be mutually exclusive, since there are a number of items which are considered by some to be vegetables and by others to be fruits. For example, although tomatoes are widely considered to be vegetables, there is a substantially minority that maintains tomatoes are a fruit. Another such example is the pepper, which, while considered by most people to be a vegetable, has been declared by the scientific community to be the fruit of the pepper plant. It will be understood, that in practicing the invention, when the term "vegetable" is used herein, it is to be read in an exclusive manner to also include fruit. Conversely, the term "fruit" as used herein is also to be read in an inclusive manner to also include vegetables.

In practicing the invention, any suitable type of nut, in any suitable form, may be used in a blendable cheese snack, according to the invention. Suitable types and forms of nuts may be raw, blanched, oil roasted, or dry roasted, and may include, but are not limited to: pecans, dry roasted peanuts, whole blanched almonds, blanched almond slivers, walnuts, hot and spicy peanuts, cashews, honey roasted peanuts, smoked almonds, or other coated nuts. In practicing the invention, it will be further understood that the term "nut" is to be liberally construed to include any suitable form of a vegetable product, such as corn nuts. Alternatively, it will be understood that products such as corn nuts are also considered to fall within the categorization of vegetables, in the context of the manner in which the term "vegetable" is used in practicing the invention. In addition, seeds such as for example sunflower seeds, pumpkin seeds, and pine nuts, may also be utilized in the practice of the invention.

In practicing the invention, "bakery products" includes any suitable form of bakery products, including, but not limited to: oat clusters, granola, sesame sticks, croutons, and bakery components such as chocolate chips. It is also intended, in defining the invention herein, that the terms "bakery product" and "seasonings" are not intended to be mutually exclusive, and includes items such as chocolate chips and coconut which may be considered by some to be seasonings, by others to be bakery products, and by yet others to be some form of a fruit, vegetable, or other type of plant product.

Other aspects, objects, and advantages of the invention will be apparent from the following detailed description and accompanying drawings.

DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
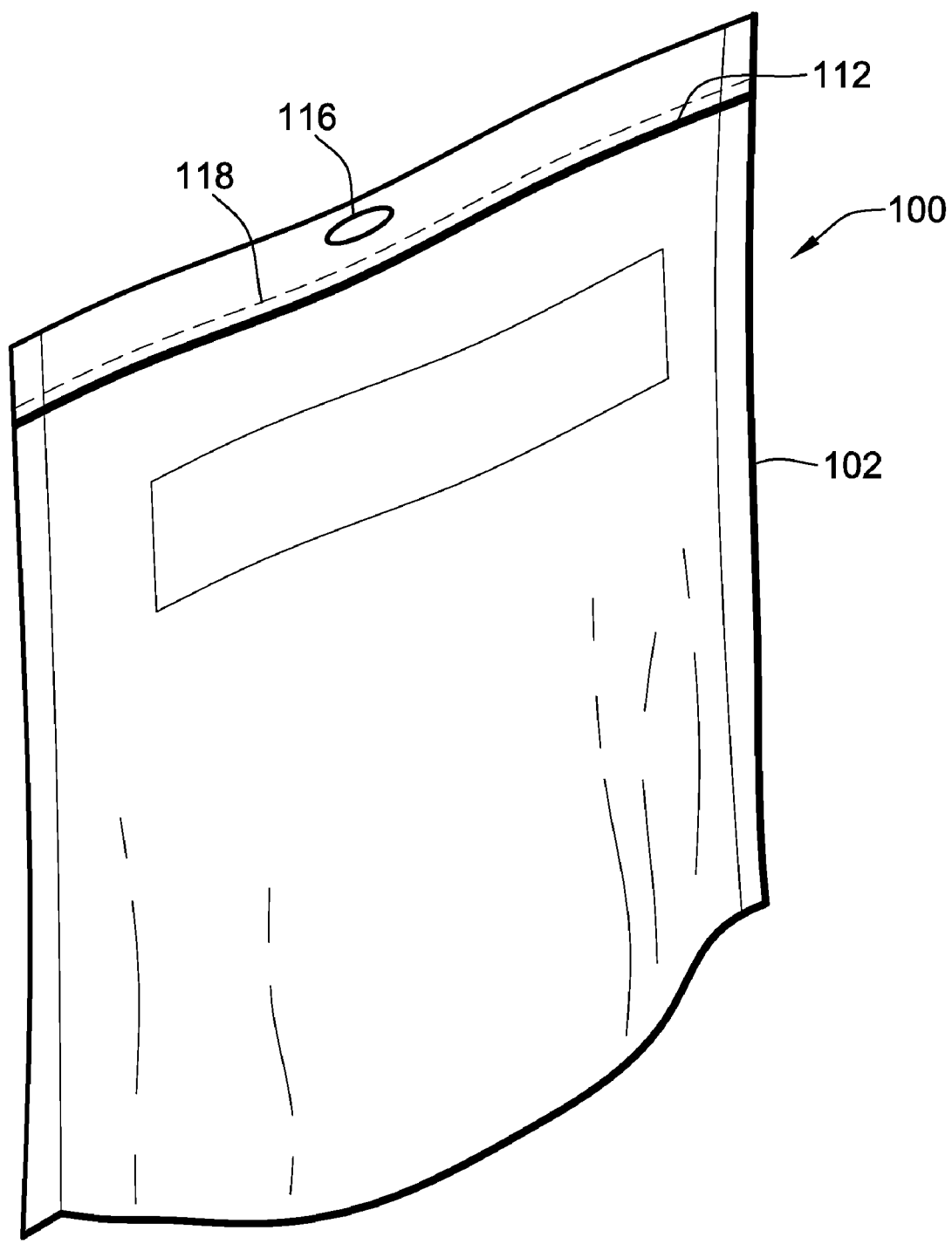
FIGS. 1 and 2 are perspective illustrations of a first exemplary embodiment of a blendable cheese snack according to the invention, in which a primary container, a secondary package and any tertiary packages are pouch-like structures.
Figure 2:
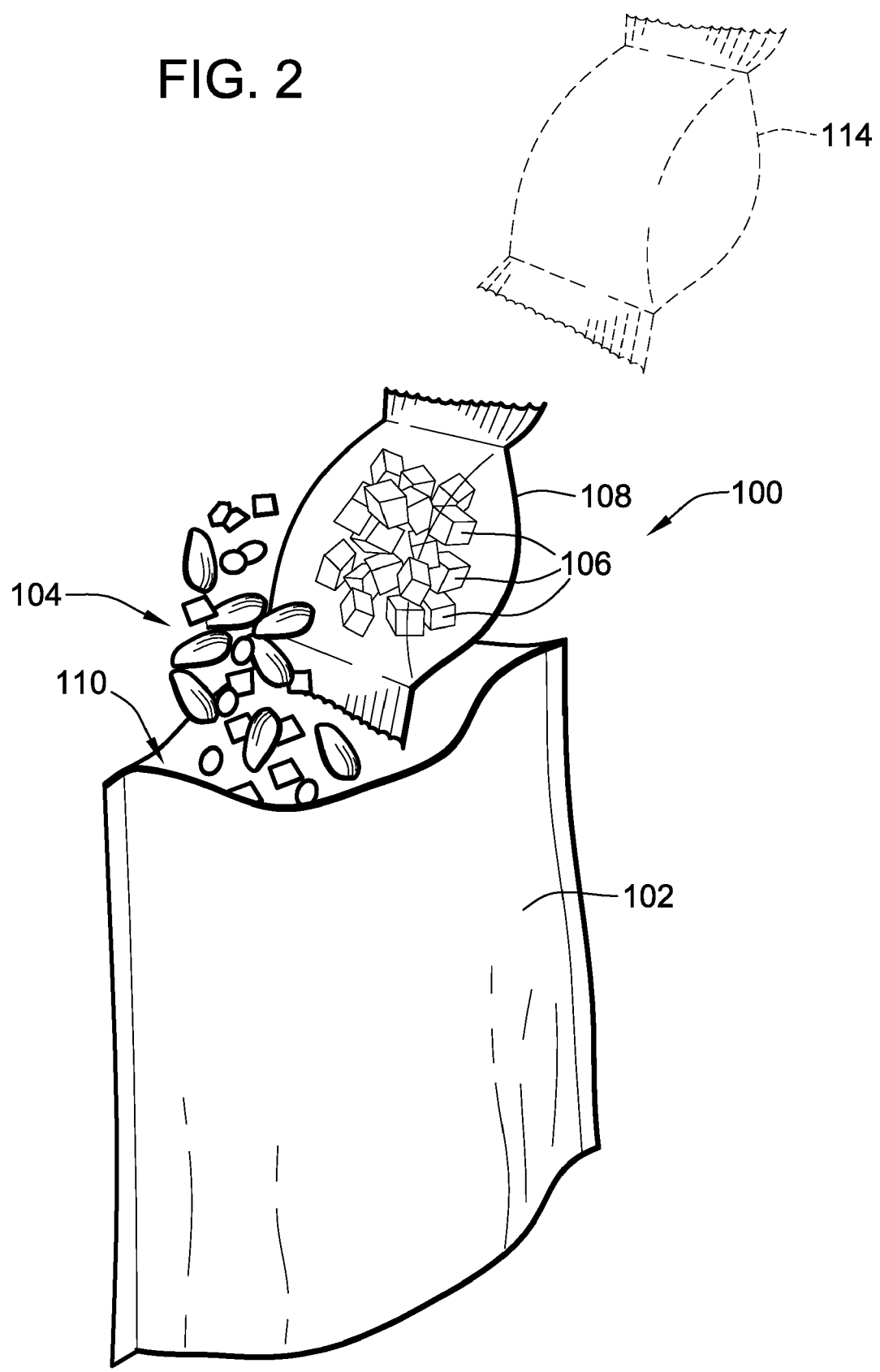
Figure 3:
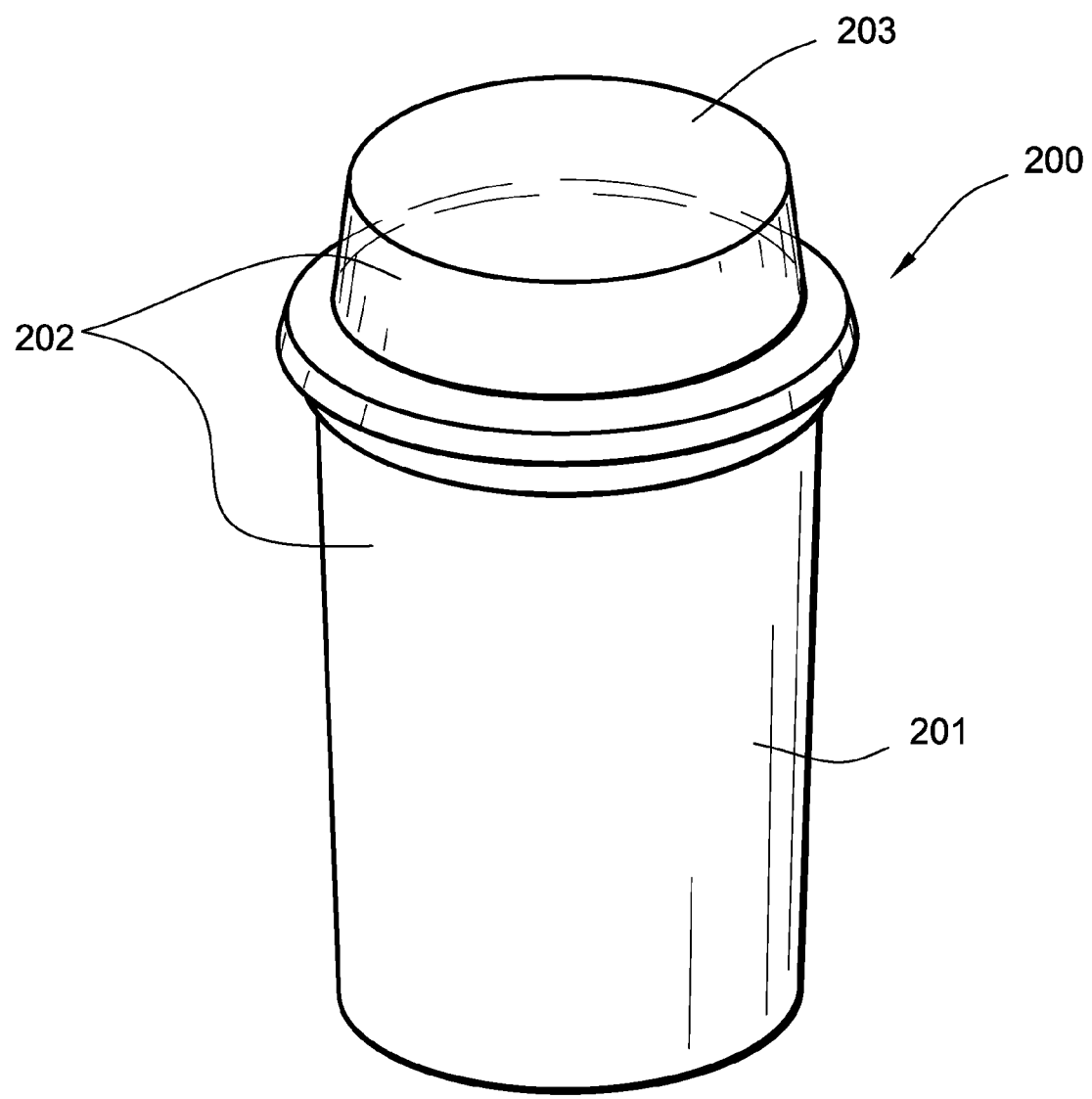
FIGS. 3-5 are perspective illustrations of a second exemplary embodiment of the invention, in which a primary container includes a cup with a detachable lid, and the secondary package is a pouch-like structure.
Figure 4:
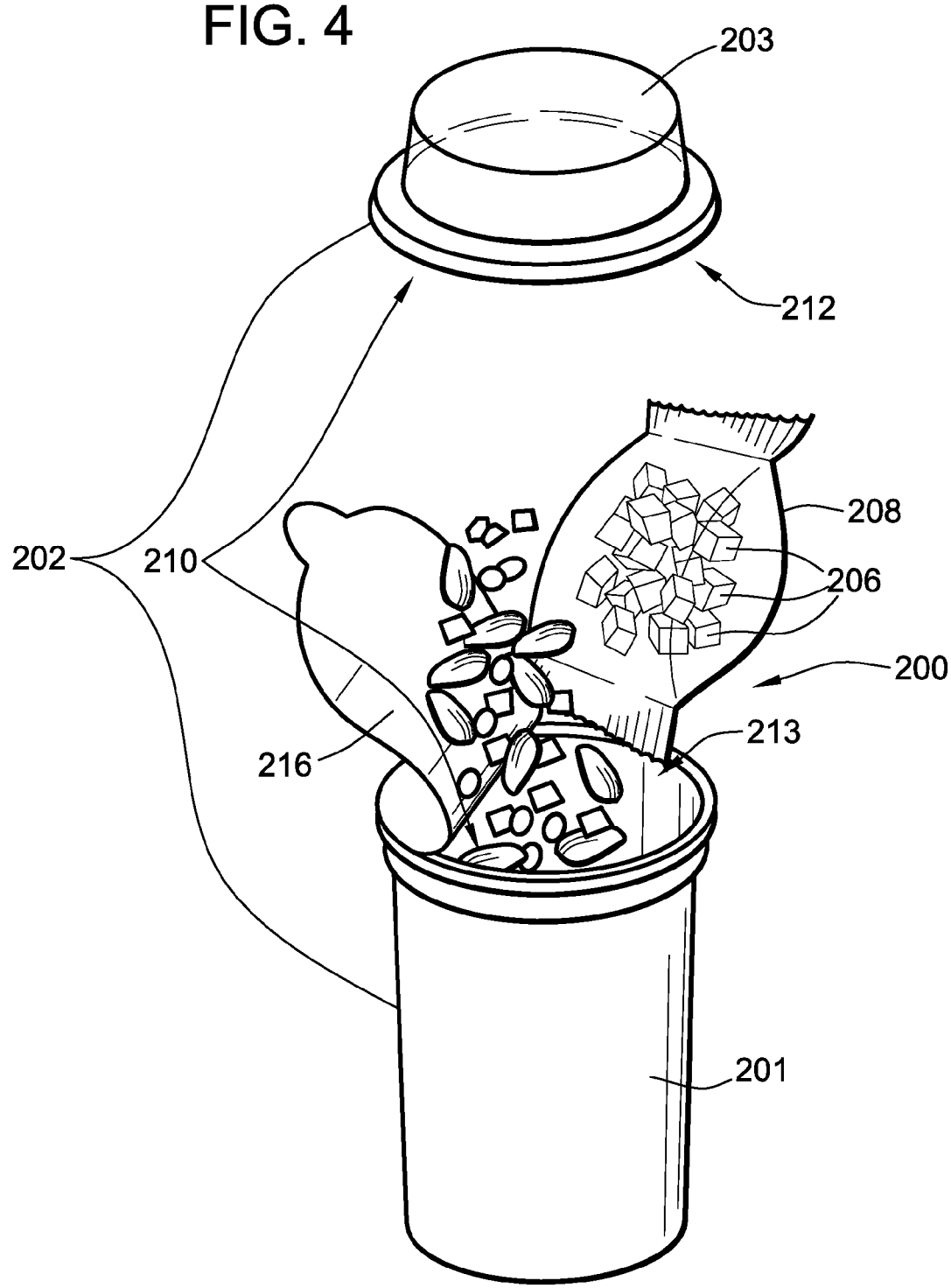
Figure 5:
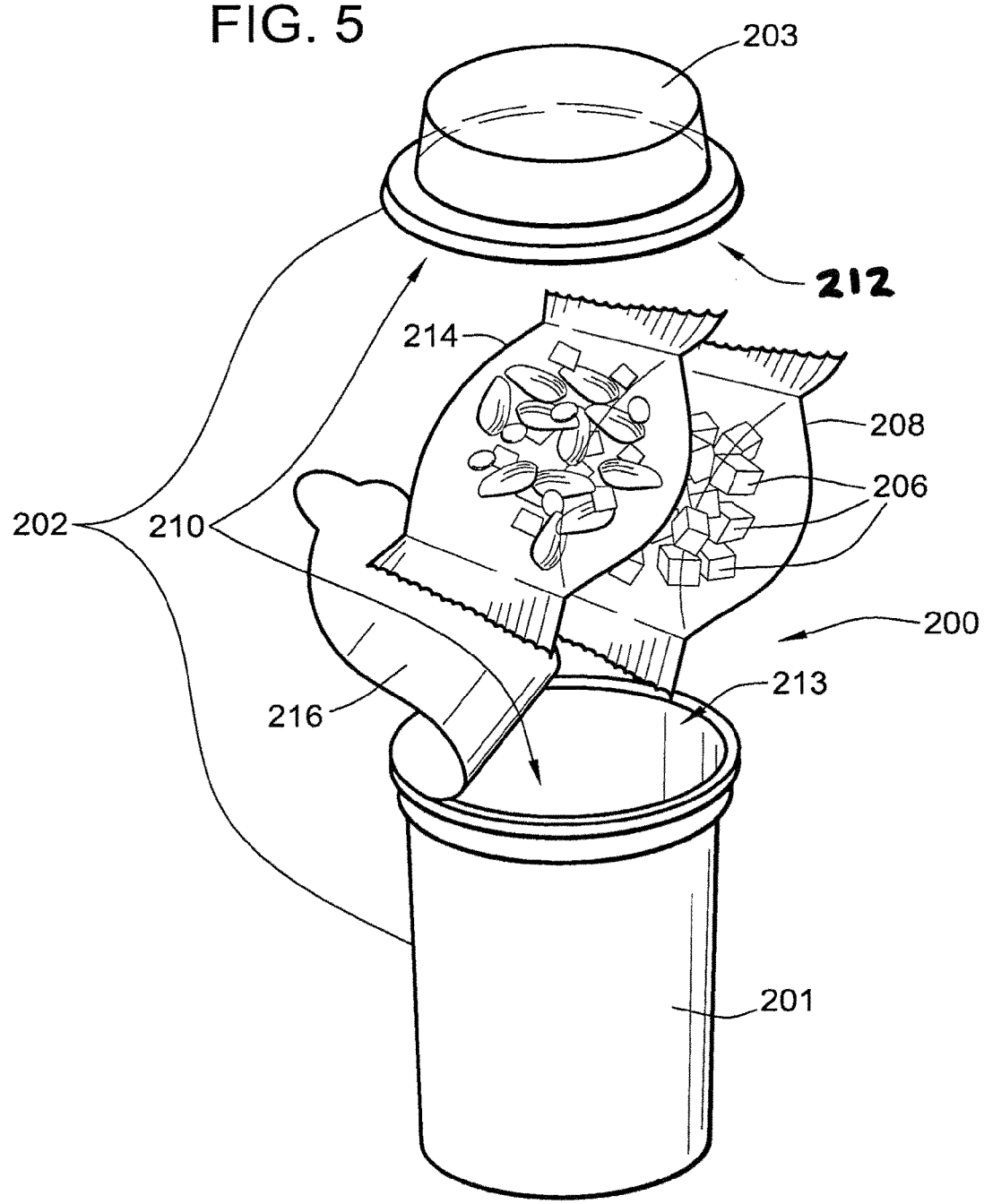
Figure 6:
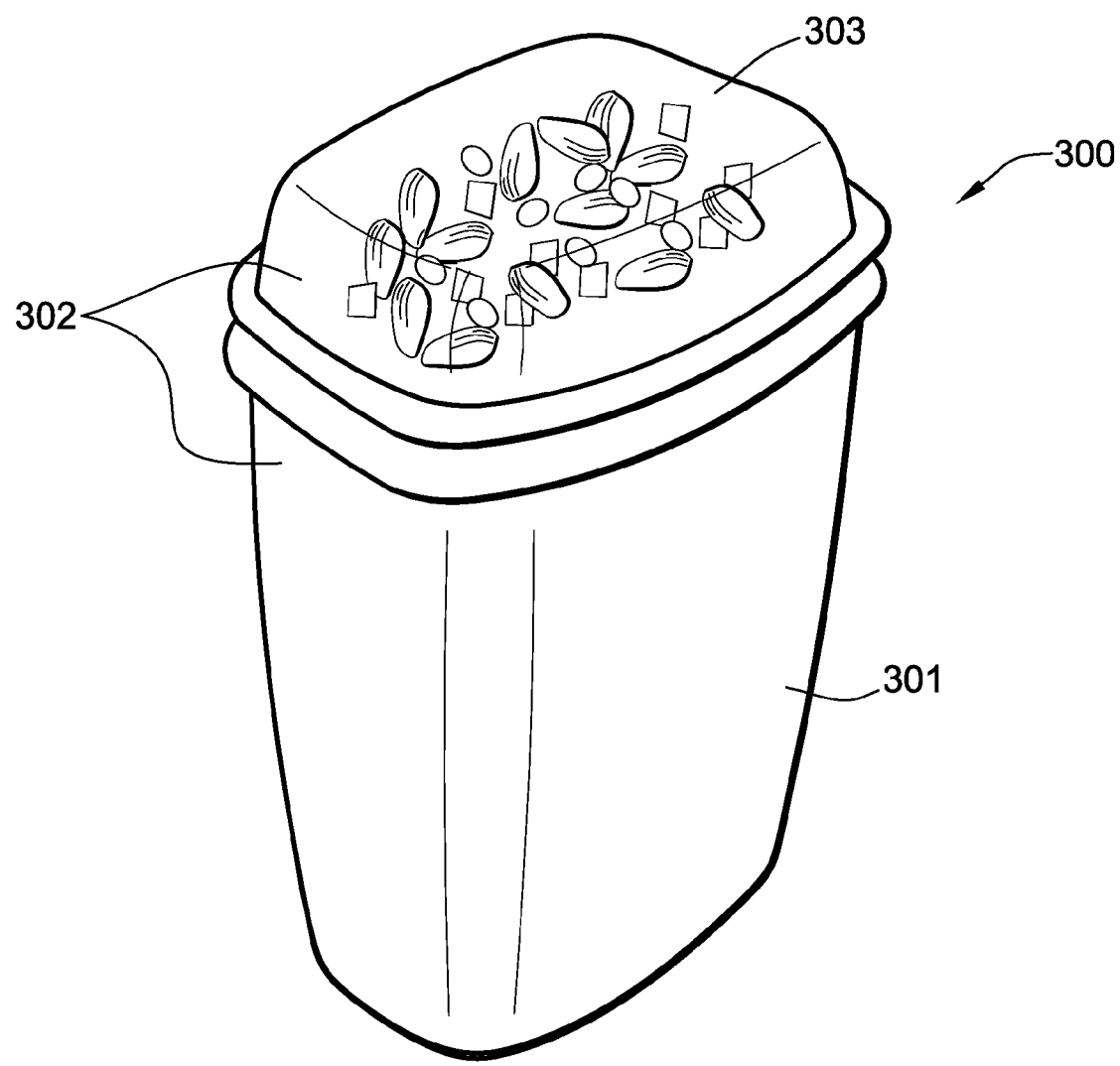
FIGS. 6 and 7 are perspective illustrations of a third exemplary embodiment of the invention, in which a container, according to the invention includes a cup with detachable arched lid, and secondary and tertiary packages are pouch-like structures.
Figure 7:
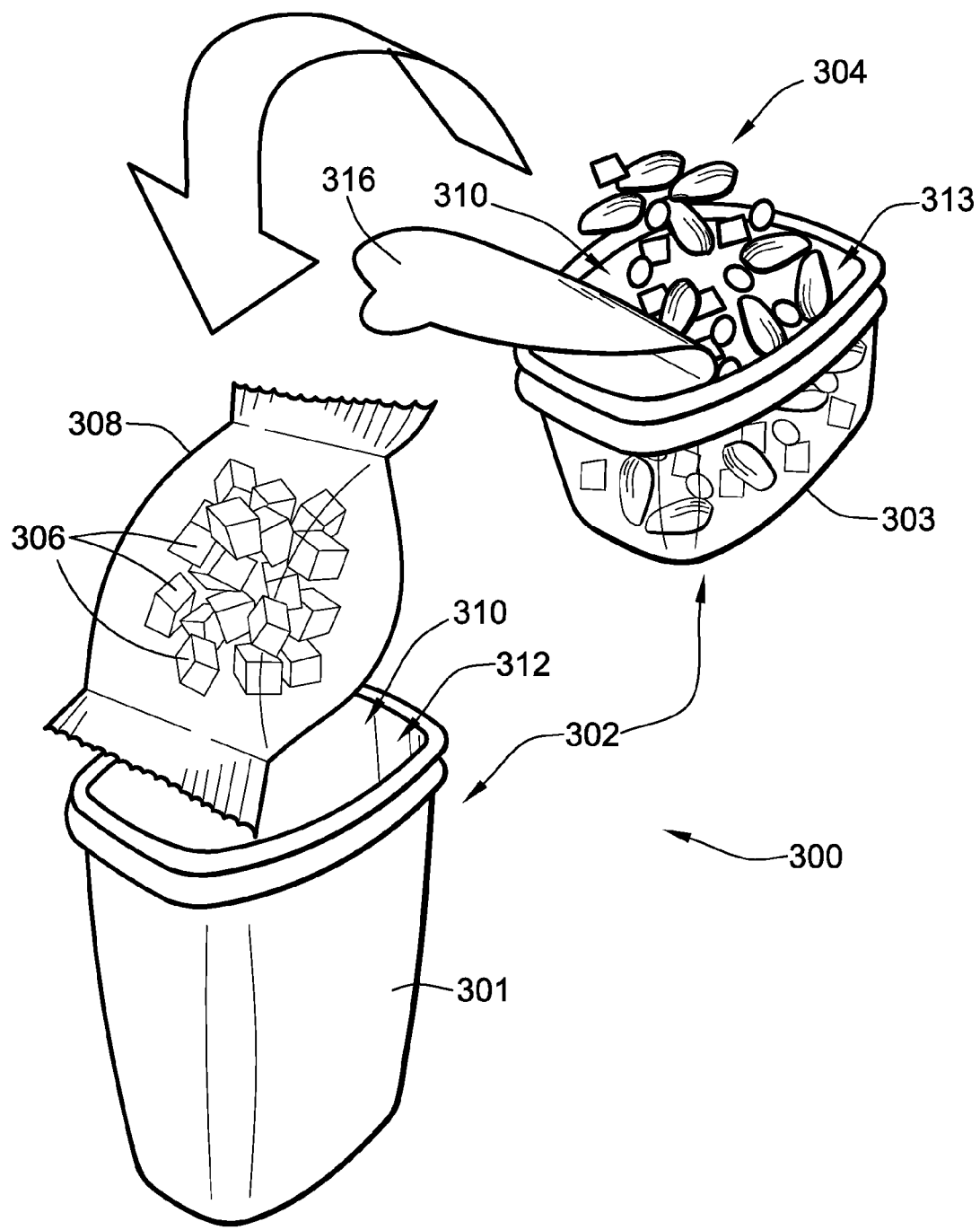

FIGS. 1 and 2 illustrate a first exemplary embodiment of a blendable cheese snack 100, according to the invention. In similar fashion, FIGS. 3 and 4 show a second exemplary embodiment of a blendable cheese snack 200, according to the invention. FIG. 5 shows a variation of the second exemplary embodiment 200 of the invention, and FIGS. 6 and 7 illustrate a third exemplary embodiment of a blendable cheese snack 300, respectively. As will be understood, by those having skill in the art, the present invention may be practiced in a wide variety of forms and embodiments, within the scope of the invention, and is by no means limited to the three exemplary embodiments and detailed examples described below and illustrated in the attached drawings.

As shown in FIGS. 1 and 2, the first exemplary embodiment of a blendable cheese snack 100, according to the invention, includes a container 102, a dry blending product 104, cheese pieces 106, and a secondary package 108. Specific examples of the dry blending product 104 and cheese pieces 106 will be discussed in greater detail below. For purposes of illustrating the invention, however, the dry blending product 104, in the first exemplary embodiment 100, is a mixture of one or more ingredients from the group consisting of dried fruits, nuts, vegetables, seasonings and bakery goods. The cheese pieces 106, shown in FIG. 2, are substantially cube-shaped dice, formed from one or more different natural or artificially produced cheeses.

As mentioned above, the dried fruits may be apples, cranberries, mangos, and raisins, and may be sweetened, or seasoned with spices such as cinnamon. The nuts may be raw, blanched, oil roasted, or dry roasted, and may include, but are not limited to: pecans, dry roasted peanuts, whole blanched almonds, blanched almond slivers, walnuts, hot and spicy peanuts, cashews, honey roasted peanuts, smoked almonds, or other coated nuts; corn nuts; and/or seeds such as for example sunflower seeds, pumpkin seeds, and pine nuts. The vegetables may be sun-dried tomatoes, garlic, basil, dehydrated tomatoes, cilantro, jalapeños, hot peppers, sweet peppers, mushrooms, onions, and imitation bacon bits or chips. The spices may be salt, pepper, basil, oregano, cinnamon, sugar, salsa Verde seasoning, and various other seasonings, coatings or treatments to provide a honey roasted, smoked, or barbeque flavor, as well as powdered The bakery products may be oat clusters, granola, sesame sticks, croutons, and bakery components such as chocolate chips and coconut.

As best seen in FIG. 2, in the first exemplary embodiment of the blendable cheese snack 100, the container 102 defines a primary volume 110 of the container 102. The dry blending product 104 is contained by the container 102 within the primary volume 110.

The secondary package 108, of the first exemplary embodiment 100, is also a sealed pouch containing the cheese pieces 106 therein, and is formed from a material which precludes loss of moisture from the cheese pieces 106 through the walls of the secondary package 108, and is preferably hermetically sealed. The secondary package 108, together with the cheese pieces 106 sealed therein, is disposed within the primary volume 110 of the container 102, together with the dry blending product 104, and the container 102 is hermetically sealed, in the manner illustrated in FIG. 1, to protect freshness of the components of the blendable cheese snack 100, within the container 102, during storage, transportation and sale of the blendable cheese snack 100. In the preferred embodiment, both the secondary package 108 and the primary volume 110 of the container 102 are hermetically sealed using modified atmosphere packaging (MAP) (typically using nitrogen) to extend the shelf-life of the product.

By packaging the cheese pieces 106, within a hermetically sealed secondary package 108 formed from a material which precludes loss of moisture from the cheese pieces, moisture in the cheese pieces 106 is substantially prevented from being transferred from the cheese pieces 106 to the dry blending product 104, until such time as a consumer wishes to mix the cheese pieces 106 with the dry blending product 104 for consumption. Precluding migration of moisture in the cheese pieces to the dry blending product is important, not only to prevent the cheese pieces from becoming dried out and less palatable, but also to ensure that the moisture content of the dry blending product remains below a threshold value of about twenty-five percent (25%), which corresponds to an Equilibrium Relative Humidity (ERH, which is a term used to describe the availability of water in foods to the chemical environment and microorganisms present in the foods) of sixty percent (60%) or less. As is known in the art, foods that are dried to below sixty percent (60%) ERH, and kept in a dry environment, are shelf-stable with regard to microbial growth, because microorganisms cannot survive below an ERH level of approximately sixty (60), which corresponds with a moisture content of approximately 20-25% in vegetables.

In practicing the invention, the dry blending product, and vegetable and fruit components thereof, in particular, should have a moisture content of approximately ten percent (10%) or less, and for some vegetables and fruits, it will be preferable that the moisture content be closer to approximately five percent (5%) or less. By sealing the moist cheese pieces 106, within the secondary package 108, according to the invention, moisture migration from the cheese pieces 106 to the dried blending product 104, within the container 102, is substantially reduced, in comparison to other cheese snacks in which cheese is mixed directly with a dry blending product. By reducing moisture migration, shelf-life of a blendable cheese snack, according to the invention, is significantly improved, without resorting to specialized treatments of the cheese pieces and dry blending product, of the type required in prior cheese snacks wherein the cheese and dry blending products are not separated from one another by a moisture barrier.

When a consumer wishes to prepare the blendable cheese snack 100 for use, the top edge of the container 102 is opened, as shown in FIG. 2, and the secondary package 108, containing the cheese pieces 106, is removed from the primary volume 110 inside the container 102. The secondary package 108 is then also opened, and the cheese pieces 106 are poured into the primary volume 110 of the container 102, together with the dry blending product 104.

The primary volume 110 of the container 102 is configured to be sufficiently large enough to allow for mixing the cheese pieces 106, from the open secondary package 108, with the dry blending product 104, within the primary volume 110 of the container 102. It is preferred that the primary volume 110 of the container 102 include sufficient head space above the cheese pieces 106 and dry blending product 104, after the cheese pieces 106 and dry blending product 104 have been poured into the container 102, that the cheese pieces 106 and dry blending product 104 may be mixed together by shaking the cheese pieces 106 and the dry blending product 104 together, within the primary volume 110.

To facilitate mixing by shaking the container 102, the container 102 may be configured to include a resealable closure feature 112, as shown in FIG. 1, such as a press-to-close fastener closure, a zipper fastener closure, or a slider fastener closure, all of which are well known in the art, for example, along the open upper end of the container 102, so that the container 102 can be conveniently held closed during the process of shaking the container 102 to mix the cheese pieces 106 and dry blending product 104 in the primary volume 110. Inclusion of the resealable closure feature 112, also provides the advantage of allowing the container 102 to be resealed during short term storage of the blendable cheese snack 100, after the cheese pieces 106 are mixed with the dry blending product 104.

The configuration of the pouch-type container 102 of the first exemplary embodiment of the blendable cheese snack 100, according to the invention, as described above, may be used in embodiments where the resultant mixture of cheese pieces 106 and dry blending product 104 is to be consumed directly from the container 102 as a snack food. The pouch-type container 102 of the first exemplary embodiment 100, may also be used in embodiments of the invention where the resultant mixture is poured, spooned from, or otherwise removed from the container 102 for use as a food topping on food items such as, for example, salads, pizza, or baked potatoes.

To facilitate snacking directly from the container 102, and removal of the resultant mixture by spooning the resultant mixture out of the primary volume 110, the container 102, of the exemplary embodiment 100, includes a bottom panel (not shown) to configure the container 102 as a stand-up pouch of the type known in the art. It may also be desirable, in some embodiments of a pouch-type container 102, according to the invention, to have all, or a portion of the container 102 be transparent, so that progress of the mixing process, as the container 102 is being shaken, for example, may be observed through the container 102, without having to periodically open the container 102 to view the contents of the primary volume 110.

In a variation of the first exemplary embodiment of the blendable cheese snack 100, it may be desirable to package the dry blending product 104 within a tertiary package 114, such as the pouch-like package indicated by dashed lines in FIG. 2, which is then placed into the primary volume 110 with the secondary package 108. It is also preferred that the tertiary package 114 be hermetically sealed using modified atmosphere packaging. The container 102 may also be provided with a peg hole 116 located near the top edge thereof as is conventional to facilitate the display of the blendable cheese snack 100 on a peg bar display (not shown herein). If desired, areas of weakness 118 such as scoring can be provided in the container 102 near the top thereof to facilitate tearing off the top of the container 102.

In another variant of the first exemplary embodiment of the blendable cheese snack 100, the tertiary package 114 may be used for containing an additional mixing component, such as a meat product, for example, with the tertiary package 114 containing the additional product being disposed in the primary volume 110, along with the dry blending product 104 and the secondary package 108 containing the cheese pieces 106, prior to the secondary and tertiary packages 108, 114 being opened by the consumer for mixing the additional product together with the cheese pieces 106 and the dry blending product 104, within the primary volume 110. This tertiary package 114 may be hermetically sealed using modified atmosphere packaging to extend the shelf-life of the product. It will be further understood, that a blendable cheese snack, according to the invention, may include more than one tertiary package 114 (with a first tertiary package 114 containing the dry blending product 104, and a second tertiary package 114 containing a meat product, for example), in addition to the secondary package 108.

FIGS. 3 and 4 illustrate a second exemplary embodiment of a blendable cheese snack 200, according to the invention. The second exemplary embodiment 200 includes a container 202, a dry blending product 204, cheese pieces 206, and a secondary package 208 containing the cheese pieces 206 and formed from a material precluding moisture migration from the cheese pieces 206 through the secondary package 208.

The container 202 of the second exemplary embodiment 200 of the invention, includes a cup 201 and an arched lid 203, with the lid 203 being adapted for attachment to an open end of the cup 201. The container 202 defines a primary volume 210 which is made up of a lid portion 212 of the primary volume 210, defined by the arched lid 203, and a cup portion 213 of the primary volume 210, defined by the cup 201 of the container 202.

In the second exemplary embodiment of a blendable cheese snack 200, according to the invention, both the secondary package 208, containing the cheese pieces 206, and the dry blending product 204, are placed within the cup portion 213 of the primary volume 210, within the cup 201, and are contained therein by a tamper-evident barrier 216 which is sealingly attached to the open end of the cup 201. Preferably the tamper evident seal 216 hermetically seals the cup portion 213 of the primary volume 210 of the container 202. In the preferred embodiment, the tamper evident seal 216 is hermetically sealed to the cup portion 213 using modified atmosphere packaging (again typically using nitrogen) to extend the shelf-life of the product.

When a consumer desires to mix the cheese pieces 206 with the dry blending product 204, the lid 203 is removed from the cup 201, the tamper-evident barrier 216 is removed from the open end of the cup 201, and the secondary packages 208 is removed from the cup 201. The secondary package 208, is then opened, and the contents thereof, (i.e. the cheese pieces 206), are poured into the cup 201, for mixing. The lid 203 is then reattached to the cup 201, to allow mixing to be accomplished conveniently by shaking the container 202. It is desirable to form the lid 203 and/or the cup 201 from a material having transparent portions, so that the contents of the container 202 may be viewed as the container 202 is shaken, to thereby facilitate determining when the cheese pieces 206 and dry blending product 204 have been thoroughly mixed with one another.

In variations of the second exemplary embodiment 200, according to the invention, additional tertiary packages (not shown) may be included to contain additional components of the cheese snack, such as meat products, for example, in the same manner as described above in the description of the first exemplary embodiment 100.

It will also be appreciated, that although the container 202 of the second exemplary embodiment 200 is essentially cylindrical in shape, in other embodiments of the invention, containers of shapes other than cylindrical may be utilized.

FIG. 5 illustrates a variant of the second exemplary embodiment of a blendable cheese snack 200, according to the invention, in which the dry blending product 204 is sealed within a tertiary pouch-like package 214, prior to being deposited within the cup portion 213 of the primary volume 210, together with the secondary package 208 containing the cheese pieces 206. Both the secondary package 208 and tertiary package 214 are then sealingly retained within the cup 201 by the tamper-evidence seal 216, and the lid 203 is attached to the cup 201.

When the consumer wishes to mix and use the blendable cheese snack 200, the lid 203 and tamper-evidence seal 216 are removed, and the second and tertiary packages 208, 214 are retrieved from the cup portion 203 of the primary volume 210. The secondary and tertiary packages 208, 214 are then opened by the consumer, and the cheese pieces 206 and dry blending product 204 contained respectively therein, are poured into the cup portion 213 of the primary volume 210. The lid 203 is then reattached to the open end of the cup 201, and the container 202 is shaken, to form a resultant mixture of the cheese pieces 206 and dry blending product 204 within the container 202.

As was the case for the previously described version of the second exemplary embodiment 200, according to the invention, once the cheese pieces 206 and dry blending product 204 are mixed, to the satisfaction of the consumer, within the container 202, the lid 203 may be removed to allow access to and use of the resultant mixture of the cheese pieces 206 and dry blending product 204 as a snack food or a food topping on foods such as salads, pizza, or baked potatoes.

FIGS. 6 and 7 show a third exemplary embodiment of a blendable cheese snack 300, according to the invention, which includes a container 302, a dry blending product 304, cheese pieces 306, and a secondary package 308. In the third exemplary embodiment of the blendable cheese snack 300, the container 302 includes a cup 301 and a mating lid 303. As will be understood from an examination of FIGS. 6 and 7, the lid 303 is arched, such that the primary volume 310 is split between a cup portion 312 of the primary volume 310, located inside of the cup 301, and a lid portion 313 of the primary volume 310, located within the arched lid 303.

The cheese pieces 306 are sealed within the secondary package 308, and the secondary package 308 containing the cheese pieces 306 therein is deposited inside the cup portion 312 of the primary volume 310. As was the case with the first and second exemplary embodiments 100, 200 described above, the secondary package, 308 of the third exemplary embodiment of the blendable cheese snack 300, according to the invention, is formed from a material providing a moisture barrier for precluding loss of moisture from the cheese pieces 306. It is also preferred that the secondary package 308 be hermetically sealed using modified atmosphere packaging.

As shown in FIG. 7, the dry blending product 304, in the third exemplary embodiment of the invention 300, is deposited into the lid portion 313 of the primary volume 310. As further illustrated in FIG. 7, the container 302, of the third exemplary embodiment 300 of the invention, includes a removable tamper-evident barrier 316, for retaining the dry blending product 304 within the lid portion 313 of the primary volume 310.

As was the case with the first and second exemplary embodiments 100, 200 of the invention, the cup portion 312 of the primary volume 310 of the container 302 is large enough in volume to receive the cheese pieces 306 and the dry blending product 304, when the secondary package 308 and tamper-evident barrier 316 are opened and the contents thereof are respectively poured into the cup 301 for mixing. Once the cheese pieces 306 and dry blending product 304 have been poured into the cup 301, and the tamper-evident barrier 316 is completely removed from the lid 303, the lid 303 is reattached to the top of the cup 301 to provide for convenient mixing of the cheese pieces 306 and dry blending product 304 within the primary volume 310 by shaking the container 302. The lid portion 313, of the primary volume 310, and any part of the cup portion 312 of the primary volume 310 extending above the cheese pieces 306 and dry blending product 304, provide sufficient head space for the cheese pieces 306 and dry blending product 304 to move freely within the primary volume 310 of the container 302 during the process of shaking the container 302 to mix the cheese pieces 306 together with the dry blending product 304.

Once the mixing process has been completed, the container 302 provides the consumer with a convenient and resealable vessel from which the resultant mixture of cheese pieces 306 and dry blending product 304 may be consumed directly as a snack food, or from which the resultant mixture may be removed, by pouring or spooning out, for example, the resultant mixture for use as a food topping on foods such as salads, pizza, or baked potatoes.

As indicated in FIGS. 6 and 7, the lid 303 of the container 302, of the second exemplary embodiment 300, is preferably formed at least partially from a transparent material, allowing the dry blending product 304 to be visible through the lid 303. In other embodiments of the invention, it may be desirable to have both the cup 301 and lid 303 of the container 302 be at least partially fabricated from materials which are transparent, translucent, or opaque, to provide an aesthetically pleasing appearance to the blendable cheese snack, according to the invention, and to allow viewing of the contents of the container 302 during the mixing process.

It will also be understood that, although the container 302 of the third exemplary embodiment 300 is substantially rectangular shaped, other embodiments of the invention may use containers, with or without the specific cup 301 and lid 303 configurations of the second exemplary embodiment 300, having shapes other than rectangular.

In variations on the third exemplary embodiment 300 of the invention, the secondary package 308, containing the cheese pieces 306, may be placed inside of the lid 303, and the dry product blend 304 may be placed inside of the cup 301. In yet other variations of the third embodiment 300, tertiary packages (not shown) may be utilized for containing the dry blending product 304, or additional moist or dry products, in the manner described above in relation to the first and second exemplary embodiments 100, 200 of the invention.

It will further be appreciated, by those having skill in the art, that where containers having cups and lids, according to the invention, are utilized in practicing the invention, that the lid need not be arched, but may be flat, concave, or any other configuration which may be desirable or appropriate for a given embodiment of the invention.

In preferred embodiments of the invention, wherein a blendable cheese snack, according to the invention, includes only cheese pieces and a dry product blend, the cheese pieces will constitute approximately forty-five percent (45%) by weight of the total weight of the mixture, and the dry blending product will constitute approximately fifty-five percent (55%) of the total weight of the mixture. Several examples of specific blendable cheese snack products, according to the invention, will now be described.

EXAMPLE I

The first example of a blendable cheese snack product, made according to the teachings of the present invention, includes mild cheddar cheese pieces, with the dry blending product including fruit, nuts, and a bakery product. Specifically, this blendable cheese snack includes approximately forty-five percent (45%), by weight of mild cheddar cheese pieces, with the dry blending product constituting fifty-five percent (55%) of the mixture by weight. The dry blending product of Example I, includes sugar infused apple dice, pecans, oat clusters, in the form of a low-fat granola, and select grade dark raisins. The sugar infused apple dice constitute approximately twenty-four percent (24%) of the dry product blend, by weight. The pecans constitute approximately eighteen percent (18%), by weight of the dry blending product. The oat clusters constitute approximately forty-two percent (42%), by weight, of the dry blending product, and the raisins constitute approximately sixteen percent (16%), by weight, of the dry blending product.

EXAMPLE II

In a second example of a blendable cheese product, according to the teachings of the present invention, the cheese pieces are white cheddar, constituting approximately forty-five percent (45%), by weight, of the second example of the blendable cheese snack, according to the invention, in combination with a dry blending product including dried fruits, nuts, and a seasoning/bakery product, in the form of milk chocolate chips. Specifically, the dried blending product, of the second example, includes by weight of the dry blending product, approximately: twenty-eight percent (28%), by weight, of sweetened, dried cranberries; twenty-three percent (23%), by weight, of milk chocolate chips; thirty percent (30%), by weight, of dry roasted peanuts; and nineteen percent (19%), by weight, of select grade dark raisins.

EXAMPLE III

The third example of a blendable cheese snack, according to the invention, includes approximately forty-five percent (45%), by weight, of Monterey Jack cheese pieces, in combination with a dry blending product, constituting approximately fifty-five percent (55%), by weight, of the third example of the blendable cheese snack, according to the invention. The dry blending product of the third example includes, by weight of the dry blending product, approximately: thirteen percent (13%) pecans; thirteen percent (13%) whole, blanched almonds, thirty-six percent (36%) sweetened, dried cranberries; and thirty-eight percent (38%) sweetened, dried mango pieces 8-10 millimeters in size.

EXAMPLE IV

The fourth example of a blendable cheese snack, according to the invention, includes approximately forty-five percent (45%), by weight, of mild cheddar cheese pieces, and approximately fifty-five percent (55%), by weight, of a dry blending product including, by weight of the dry blending product, approximately: eighteen percent (18%) apple/cinnamon dice, having substantially cube-shaped pieces of apple in the range of ⅜-½" in size, dried and coated with topical cinnamon; sixteen percent (16%) whole, blanched, almonds; five percent (5%) blanched almond slivers; thirty percent (30%) select dark raisins; and approximately thirty percent (30%) select golden raisins.

EXAMPLE V

The fifth example of a blendable cheese snack, according to the invention, includes a mixture of mozzarella and asiago cheese pieces, constituting approximately forty-five percent (45%), by weight, of the blendable cheese snack, and a dry blending product constituting approximately fifty-five percent (55%), by weight, of the fifth example of the blended cheese snack. The mixture of mozzarella and asiago cheese pieces constitutes a ratio of approximately sixty-seven percent (67%) mozzarella pieces to thirty-three percent (33%) asiago cheese pieces. The dry blending product, of the fifth example, includes, by weight of the dry blending product, approximately: forty-two percent (42%) sweetened, dried cranberries; eighteen percent (18%) medium/small walnuts; eighteen percent (18%) select grade dark raisins; and twenty-two percent (22%) whole, blanched almonds.

EXAMPLE VI

The sixth example, of a blendable cheese snack, according to the invention, includes approximately forty-five percent (45%), by weight, of pepper jack cheese pieces, and approximately fifty-five percent (55%), by weight, of a dry blending product including, by weight of the dry blending product, approximately: forty percent (40%) hot and spicy medium peanuts; forty percent (40%) whole, blanched almonds; and twenty percent (20%) corn nuts.

EXAMPLE VII

The seventh example of a blendable cheese snack, according to the invention, includes approximately forty-five percent (45%), by weight, sharp cheddar cheese pieces, and approximately fifty-five percent (55%), by weight, of a dry blending product including, by weight of the dry blending product, approximately: twenty-five percent (25%) cashews; fifty-five percent (55%) dry roasted peanuts; and twenty percent (20%) medium/small walnuts.

EXAMPLE VIII

The eighth example of a blendable cheese snack, according to the invention, includes approximately forty-five percent (45%), by weight, sharp cheddar cheese pieces, and approximately fifty-five percent (55%), by weight, of a dry blending product including, by weight of the dry blending product, approximately: fifty percent (50%) honey roasted peanuts; thirty percent (30%) smoked almonds; and twenty percent (20%) barbecue (BBQ) sesame sticks.

EXAMPLE IX

The ninth example of a blendable cheese snack, according to the invention, includes approximately thirty-five percent (35%), by weight, sharp cheddar cheese pieces, ten percent (10%), by weight, pepperoni strips, and approximately fifty-five percent (55%), by weight, of a dry blending product including, by weight of the dry blending product, approximately: fifty percent (50%) honey roasted peanuts; thirty percent (30%) smoked almonds; and twenty percent (20%) barbeque (BBQ) sesame sticks.

EXAMPLE X

The tenth example of a blendable cheese snack, according to the invention, includes approximately thirty-five percent (35%), by weight, sharp cheddar cheese pieces, ten percent (10%), by weight, beef jerky pieces, and approximately fifty-five percent (55%), by weight, of a dry blending product including, by weight of the dry blending product, approximately: fifty percent (50%) honey roasted peanuts; thirty percent (30%) smoked almonds; and twenty percent (20%) barbeque (BBQ) sesame sticks.

In all of the above Examples I-X, the cheese pieces are substantially cube-shaped dice, having an approximate dimension of ⅜ of an inch.

It will be understood, by those having skill in the art, that the invention may be practiced with many other formulations of constituents in a blendable cheese snack, within the meaning of the constituent terms laid out herein above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A blendable cheese snack, comprising:
   a hermetically sealed container defining a primary volume of the container;
   a dry blending product disposed within the primary volume; and
   cheese pieces, having a desired approximate shape and size, sealed within a secondary package formed from a material precluding loss of moisture from the cheese pieces;
   wherein the secondary package, containing the cheese pieces therein, is disposed within the primary volume of the container, together with the dry blending product, prior to the secondary package being opened by a consumer for mixing with the dry blending product;
   the primary volume of the container being sufficient for mixing the cheese pieces from the opened secondary package with the dry blending product within the primary volume.

2. A blendable cheese snack as defined in claim 1, wherein the secondary package is hermetically sealed.

3. A blendable cheese snack as defined in claim 1, wherein at least a portion of the container is transparent.

4. A blendable cheese snack as defined in claim 1, wherein the container is sized and shaped for allowing the resultant mixture of cheese pieces and dry blending product to be consumed directly from the container as a snack food.

5. A blendable cheese snack as defined in claim 1, wherein the container is configured for allowing the resultant mixture to be removed from the container for use as a food topping.

6. A blendable cheese snack as defined in claim 1, further comprising a tertiary package disposed within the primary volume and containing the dry blending product prior to the tertiary package being opened by the consumer for mixing together the cheese pieces and dry blending product, from the opened secondary and tertiary packages within the primary volume.

7. A blendable cheese snack as defined in claim 6, wherein the tertiary package is hermetically sealed.

8. A blendable cheese snack as defined in claim 1, further comprising a tertiary package disposed within the primary volume and containing a meat product therein, prior to the secondary and tertiary packages being opened by the consumer for mixing the meat product together with the cheese pieces and dry blending product, from the opened secondary and tertiary packages within the primary volume.

9. A blendable cheese snack as defined in claim 1, wherein the tertiary package is hermetically sealed.

10. A blendable cheese snack as defined in claim 1, wherein the container comprises a cup having a detachable lid for closing the primary volume.

11. A blendable cheese snack as defined in claim 10, wherein the container further includes a removable tamper-evident barrier for retaining the secondary package containing the cheese pieces and/or the dry blending product within the cup when the lid is removed.

12. A blendable cheese snack as defined in claim 10, further comprising a tertiary package disposed within the primary volume and containing the dry blending product prior to the tertiary package being opened by the consumer for mixing together the cheese pieces and dry blending product from the opened secondary and tertiary packages within the primary volume.

13. A blendable cheese snack as defined in claim 10, further comprising a tertiary package disposed within the primary volume and containing a meat product therein, prior to the tertiary package being opened by the consumer for mixing the meat product together with the cheese pieces and dry blending product, from the opened primary, secondary, and tertiary packages within the primary volume.

14. A blendable cheese snack as defined in claim 10, wherein the lid defines a secondary volume of the container, and includes a barrier member for retaining either the secondary package containing the cheese pieces or the dry blending product within the lid.

15. A blendable cheese snack as defined in claim 14, wherein the lid is formed at least partially from a transparent material.

16. A blendable cheese snack as defined in claim 1, wherein the primary volume of the container includes sufficient headspace that the cheese pieces and dry blending product may be mixed together by pouring the cheese pieces from the opened secondary package into the primary volume and shaking the cheese pieces and dry blending product, within the primary volume.

17. A blendable cheese snack as defined in claim 16, wherein the container includes a cup having a detachable lid for closing the primary volume, with the lid at least partially defining the headspace.

18. A blendable cheese snack as defined in claim 1, wherein the container and secondary package are both sealed pouches which are opened by the consumer prior to mixing the cheese pieces and dry blending product together in the primary volume.

19. A blendable cheese snack as defined in claim 18, wherein the pouch forming the container is re-sealable.

20. A blendable cheese snack as defined in claim 19, wherein the pouch forming the container is a stand-up pouch.

21. A blendable cheese snack as defined in claim 1, wherein the cheese pieces are at least one of substantially cube-shaped, sticks of cheese, cheese shreds, cheese curds, or string cheese.

22. A blendable cheese snack as defined in claim 21, wherein the dry blending product comprises one or more ingredients from the group consisting of dried fruits, nuts, seeds, vegetables, seasonings, and bakery goods.

23. A blendable cheese snack as defined in claim 21, wherein the cheese pieces comprises a mixture of at least two different cheeses.

24. A blendable cheese snack as defined in claim 23, wherein the dry blending product comprises one or more ingredients from the group consisting of dried fruits, nuts, seeds, vegetables, seasonings, and bakery goods.

25. A blendable cheese snack as defined in claim 1, wherein the cheese pieces comprises a mixture of at least two different cheeses.

26. A blendable cheese snack as defined in claim 25, wherein the dry blending product comprises one or more ingredients from the group consisting of dried fruits, nuts, seeds, vegetables, seasonings, and bakery goods.

27. A blendable cheese snack as defined in claim 1, wherein the dry blending product comprises one or more ingredients from the group consisting of dried fruits, nuts, seeds, vegetables, seasonings, and bakery goods.

28. A blendable cheese snack, comprising:
a container defining a primary volume of the container;
a dry blending product disposed within the primary volume; and
cheese pieces, having a desired approximate shape and size, sealed within a secondary package formed from a material precluding loss of moisture from the cheese pieces;
the dry blending product comprising one or more ingredients from the group consisting of dried fruits, nuts, seeds, vegetables, seasonings, and bakery goods;
the secondary package, containing the cheese pieces therein, being disposed within the primary volume of the container, together with the dry blending product, prior to the secondary package being opened by a consumer for mixing with the dry blending product;
the primary volume of the container including sufficient headspace that the cheese pieces and dry blending product may be mixed by pouring the cheese pieces from the opened secondary package into the primary volume and shaking, together, the cheese pieces and dry blending product mixture, within the primary volume.

29. A blendable cheese snack as defined in claim 28, wherein the secondary package is hermetically sealed to prevent flavor carryover between the cheese pieces and the dry blending product.

30. A blendable cheese snack as defined in claim 28, wherein at least a portion of the primary volume of the container is hermetically sealed.

31. A blendable cheese snack as defined in claim 28, wherein the container includes a re-sealable closure.

32. A blendable cheese snack as defined in claim 28, further comprising one or more tertiary packages disposed within the primary volume, and containing either the dry blending product or an additional moist or dry constituent of the blendable cheese snack, prior to the one or more tertiary packages being opened by the consumer for mixing together the cheese pieces and contents of the opened secondary and tertiary packages within the primary volume.

33. A blendable cheese snack as defined in claim 28, wherein the container comprises a cup having a detachable lid for closing the primary volume.

34. A blendable cheese snack as defined in claim 33, wherein the container further includes a removable tamper-evident barrier for retaining the secondary package containing the cheese pieces and/or the dry blending product within the cup when the lid is removed, and/or within the lid when the cup is removed.

35. A blendable cheese snack as defined in claim 33, wherein the lid defines a portion of the primary volume of the container, and includes a barrier member for retaining either the secondary package containing the cheese pieces or the dry blending product within the lid.

36. A blendable cheese snack as defined in claim 33, wherein the container includes a cup having a detachable lid for closing the primary volume, with the lid at least partially defining the headspace.

37. A blendable cheese snack, comprising:
a plurality of cheese pieces, having a desired approximate shape and size;
a dry blending product;
a container defining a primary volume of the container, wherein one of the plurality of cheese pieces and the dry blending product are disposed within the primary volume; and
a secondary package formed from a material precluding the passage of moisture therethrough, wherein the other of said plurality of cheese pieces and the dry blending product are disposed therein, the secondary package being disposed within the primary volume of the container, together with the one of the plurality of cheese pieces and the dry blending product, prior to the secondary package being opened by a consumer;
wherein the primary volume of the container is sufficient for mixing the other of the cheese pieces and the dry blending product from the opened secondary package with the one of said cheese pieces and the dry blending product within the primary volume;
wherein the container and the secondary package are both sealed pouches.

38. A blendable multi-component snack, comprising:
a container defining a primary volume of the container;
a first blending product disposed within the primary volume; and
a second blending product sealed within a secondary package formed from a material precluding the passage of moisture therethrough;
the secondary package, containing the second blending product therein, being disposed within the primary volume of the container, together with the first blending product, prior to the secondary package being opened by a consumer for mixing with the first blending product;
the primary volume of the container being sufficient for mixing the second blending product from the opened secondary package with the first blending product within the primary volume.

39. A blendable multi-component snack as defined in 38, wherein one of the first and second blending products contains moisture and the other of the first and second blending products contains substantially no moisture.

40. A blendable multi-component snack as defined in claim 38, wherein both of the first and second blending products contain moisture.

41. A blendable multi-component snack as defined in claim 38, wherein both of the first and second blending products contain substantially no moisture.

42. A method for preparing a blendable cheese snack, comprising:
manufacturing a container defining a primary volume of the container;
placing a dry blending product within the primary volume;
sealing cheese pieces within a secondary package formed from a material precluding loss of moisture from the cheese pieces; and
placing the secondary package, containing the cheese pieces therein, within the primary volume of the container, together with the dry blending product.

43. A method as defined in claim 42, further comprising closing the container.

44. A method as defined in claim 43, further comprising hermetically sealing either or both of the secondary package and the container.

45. A method as defined in claim 42, further comprising:
opening the secondary package for mixing the cheese pieces with the dry blending product; and
mixing the cheese pieces from the opened secondary package with the dry blending product within the primary volume to form a resultant mixture of cheese pieces and dry blending product.

46. A method as defined in claim 45, further comprising retaining the resultant mixture of cheese pieces and dry blending product in the container, for consumption directly from the container.

47. A method as defined in claim 45, further comprising removing at least a portion of the resultant mixture from the container for use as a food topping.

48. A method as defined in claim 45, further comprising:
placing a tertiary package containing the dry blending product within the primary volume of the container, together with the secondary package containing the cheese pieces;
opening the secondary and tertiary packages for mixing the cheese pieces with the dry blending product; and
mixing the cheese pieces from the opened secondary package with the dry blending product from the tertiary package, within the primary volume, to form a resultant mixture of cheese pieces and dry blending product.

49. A method as defined in claim 48, further comprising retaining the resultant mixture of cheese pieces and dry blending product in the container, for consumption directly from the container.

50. A method as defined in claim 49, further comprising removing at least a portion of the resultant mixture from the container for use as a food topping.

51. A method as defined in claim 50, further comprising:
placing a second tertiary package, containing a meat product sealed therein, within the primary volume of the container, together with the secondary package containing the cheese pieces and the first tertiary package containing the dry blending product;
opening the secondary and first and second tertiary packages for mixing the cheese pieces and meat product with the dry blending product; and
mixing the cheese pieces from the opened secondary package with both the dry blending product from the first tertiary package and the meat product from the second tertiary package, within the primary volume, to form a resultant mixture of cheese pieces, meat product and dry blending product.

52. A method as defined in claim 42, further comprising retaining the resultant mixture of cheese pieces and dry blending product in the container, for consumption directly from the container.

53. A method as defined in claim 42, further comprising removing at least a portion of the resultant mixture from the container for use as a food topping.

54. A method as defined in claim 42, further comprising:
manufacturing the container to include a closure element that is openable and reclosable;
opening the closure element for removal of the secondary package from the primary volume;
pouring of the contents of the secondary package into the primary volume;
closing the closure element;
shaking the container, with the closure element closed, to mix the contents of the primary volume with one another; and
opening the closure element, after mixing, for allowing access to the blended cheese snack in the primary volume.

55. A method as defined in claim 42, further comprising placing one or more tertiary packages, containing the dry blending product or other products, into the primary volume.

56. A method as defined in claim 55, further comprising:
manufacturing the container to include a closure element that is openable and reclosable;
opening the closure element for removal of the secondary and the one or more tertiary packages from the primary volume;
pouring of the contents of the secondary and tertiary packages into the primary volume;
closing the closure element;
shaking the container, with the closure element closed, to mix the contents of the primary volume with one another, to form the blended cheese snack; and
opening the closure element, after mixing, for allowing access to the blended cheese snack in the primary volume.

* * * * *